United States Patent [19]
Sorenson

[11] 3,973,583
[45] Aug. 10, 1976

[54] FLUID CONTROL SYSTEM

[76] Inventor: Gerald T. Sorenson, 3440 Nagawicka Road, Hartland, Wis. 53029

[22] Filed: May 16, 1974

[21] Appl. No.: 470,583

Related U.S. Application Data

[63] Continuation-in-part of Ser. No. 362,456, May 21, 1973, Pat. No. 3,938,543.

[52] U.S. Cl.............................. 137/312; 137/625.18; 137/625.48
[51] Int. Cl.² ...................... F16K 27/04; F16K 3/24
[58] Field of Search........... 137/312, 625.48, 625.18

[56] References Cited
UNITED STATES PATENTS

| | | | |
|---|---|---|---|
| 2,167,106 | 7/1939 | Dunham et al. ............ | 137/625.48 X |
| 2,765,808 | 10/1956 | Tydeman ..................... | 137/312 X |
| 3,086,553 | 4/1963 | Levine .......................... | 251/31 X |
| 3,246,667 | 4/1966 | Pemberton.................... | 137/312 |
| 3,516,445 | 6/1970 | Skeates......................... | 137/312 X |
| 3,605,792 | 9/1971 | Westbrook.................... | 137/312 |
| 3,707,984 | 1/1973 | Bantz............................ | 137/312 |

*Primary Examiner*—Arnold Rosenthal
*Attorney, Agent, or Firm*—Quarles & Brady

[57] ABSTRACT

Fluid control systems for controlling machine tool operations or other automated mechanical devices. An unlimited number of multiple function systems can be assembled from a basic simple function system employing two-way relay valves which, in their normally blocked state, have a "controlled leakage" venting feature effective to prevent any leakage to outlet and possible system malfunction. This controlled leakage venting feature is constructed so that the leakage path is never exposed to line pressure when a valve changes state from blocked to passing or vice-versa. Fluid memory can also be built in the system. Simple relay valves, limit valves, pressure control relay valves, time delay relay valves and other variations in spool and slide form provide controlled leakage.

20 Claims, 35 Drawing Figures

FLUID CONTROL SYSTEM

FIELD OF THE INVENTION

This application is a continuation-in-part of application Ser. No. 362,456, filed May 21, 1973 now U.S. Pat. No. 3,938,543 and entitled FLUID CONTROL SYSTEM.

The invention relates to automatic fluid control systems. It deals more particularly with fluid control relay valves and switches and the like for such fluid control systems.

BACKGROUND OF THE INVENTION

Automatic control systems for industrial machinery and the like are, of course, well known. The most widely used automatic control systems are electrical and employ conventional circuitry including electro-mechanical relays, push-button switches, selector switches, limit switches and pressure switches and the like to initiate, control and terminate operation of the machine.

Just coming into prominence in recent years as an alternative to electrical systems are automatic control systems which employ pressurized fluid; i.e., either positive or negative (vacuum) pressure as a motive force. Fluid control systems of this type have the advantage of being virtually shock and explosion proof, requiring minimal shielding. Furthermore, the service life of fluid control system components, control valves, for example, far exceeds that of electrical relays and the like.

The automatic fluid control systems presently available are severely limited in complexity and flexibility, however, by problems heretofore thought to be inherent in their make-up and, consequently, insoluble. As a result, these fluid control systems have found relatively limited use compared to the wide-spread utilization of automatic control systems using electro-mechanical relays with isolated pole electrical contacts, pressure switches, etc., to perform logic and control power functions.

As will hereinafter be discussed in relation to the system embodying features of the present invention, the problems heretofore thought to be inherent in fluid type automatic control systems reside basically in the construction and utilization of the control valves employed. Accordingly, a brief discussion of basic, conventional valve constructions is a valuable preface to an understanding of the present invention and its advantages.

The most commonly used types of directional, fluid control, relay valves, for example, are spool valves, slide valves, and poppet valves. Spool valves and slide valves are shear-action devices incorporating a movable valve element which slides across fluid flow paths to control flow between adjacent ports. The poppet valve on the other hand, is a seating action device which includes a movable member adapted to seat and obstruct a flow path whereby flow between adjacent ports is controlled.

A spool valve utilizes a valve body containing a cylindrical bore having a plurality of cylindrical valve sealing surfaces spaced along its axis, with valve ports normally extending radially through the body into communication with the bore between the sealing surfaces. The spool includes a plurality of cylindrical lands which selectively mate with the valve sealing surfaces in the bore as the spool is moved axially, so as to control the flow of pressurized fluid between the ports. The valve sealing surfaces (or the spool) might incorporate sealing O-rings, for example, to improve the seal between the spool and the valve body bore or, in the alternative, a precision sliding fit may be established between the bore and the spool to limit leakage between the ports.

The slide valve utilizes a valve body having a precision, lapped surface with holes or slots intersecting the surface. The holes or slots lead to separate ports in the valve body. A movable element referred to as a "slider", having a precision, lapped surface, with slots or connecting holes in the surface, alternatively connects or blocks the flow of pressurized fluid between ports as the slider is moved relative to the body surface. Leakage between the ports is limited by the small amount of clearance afforded at the precision, lapped surfaces.

Finally, the poppet valve includes a body having an axial bore formed therein with annular seats in the bore between its opposite end ports. A spool which incorporates annular surfaces designed to coact with the annular seats in the body moves axially in the bore and selectively blocks flow between the ports.

Automatic control systems of the fluid type presently in use all employ standard valves of the aforedescribed character. The spool valve is most commonly used. As previously implied, however, these standard spool valves, slide valves, and poppet valves all have a common failing which places severe limitations on their use in an automatic, sequential control system, and, accordingly, limit the type of logic which can be performed by conventional systems. These standard valves have necessarily been used as three-way valves, with the output passage of a normally blocked pressure path connected to a hydraulic tank, in the case of a liquid system, or to atmospheric pressure in the case of an air system, any leakage in the valve between the ports tends to build up pressure at the output port. The result is a false signal which may cause the system to malfunction. Because of this valve function requirement, present systems have been limited in complexity and flexibility, as heretofore has been pointed out. This is one reason why a large percentage of the automatic control systems in present use are electro-mechanical systems.

Actually there are, in the virtually limitless valve art, valve constructions which are designed to provide a leakage path for hydraulic fluid so as to forestall inadvertent system malfunction. The Tydeman U.S. Pat. No. 2,765,808 illustrates such a valve. However, each has employed a construction wherein line pressure is vented when the valve changes state, a highly undesirable result in any fluid system.

Regarding the resultant wide use of electro-mechanical systems, it follows that thousands of trained technicians throughout the world are familiar with the abstract symbols and schematic diagrams used for automatic electrical control systems employing electro-mechanical relays. Because fluid control system valves and valve functions, as they are presently known, cannot be functionally interchanged with electro-mechanical isolated pole relays, pressure switches, limit switches, selector switches and push button switches and the like, the understanding and use of the fluid control systems by technicians trained in the conventional automatic electrical control systems has been extremely difficult, if not impossible. As a result, the utility and serviceability of present fluid control systems has been severely limited.

SUMMARY OF THE INVENTION

It is therefore an object of the present invention to provide an improved, automatic, fluid control system which retains the long service life and safety features of presently known fluid control systems yet assures a flexibility and serviceability which is greater than that which can be obtained with electrical control systems. It is another object to provide an improved, automatic, fluid control system which has these advantages in flexibility and serviceability, yet is considerably simpler and less expensive then fluid control systems presently in use. Still another object is to provide an automatic fluid control system which lends itself to simple diagramming using abstract electrical symbols whereby the system may be designed, understood and serviced by personnel already technically trained on automatic electric control systems.

A further object is to provide an automatic fluid control system which utilizes isolated pairs of two port, flow paths, either normally blocked or normally passing to signal pressure, to control system functions. Yet a further object is to provide an improved fluid control system wherein fluid control signals may readily be teed together. Another object is to provide a fluid control system which has a pressure memory capability.

Still a further object is to provide an improved fluid control device for an automatic fluid control system which prevents leakage of pressurized fluid from one port (inlet) of a pair of normally blocked ports to the other of said ports (outlet) by controlled leakage of fluid to exhaust means which bracket the inlet and outlet ports but are not disposed between them. Another object is to provide improved fluid control devices in an automatic fluid control system which prevent leakage of the pressurized fluid between pairs of adjacent ports.

Another object is to provide an improved fluid control relay wherein pairs of ports, or contacts as they would be designated in electrical systems parlance, are non-oriented; i.e., it does not matter to which port of a set of ports the pressure or absence of pressure (vacuum) is applied. Still another object is to provide improved fluid control relay wherein the pairs of ports or contacts are isolated to prevent signals from adjacent pairs of ports or contacts from intermixing.

Additional specific objects of the invention include the provision of a number of improved fluid control devices and system components. These comprise a fluid selector valve, a fluid push-button valve, a fluid pressure sensing relay wherein snap action is provided, a fluid time delay relay wherein snap action is provided, a fluid limit valve, or switch in electrical system parlance, wherein snap action is provided. They also include an improved fluid conduit fitting.

BRIEF DESCRIPTION OF THE DRAWINGS

The invention, including its construction and method of operation, together with other objects and advantages thereof, is illustrated more or less diagrammatically in the drawings, in which.

DESCRIPTION OF THE PREFERRED EMBODIMENTS

The automatic fluid control system embodying features of the invention is best understood by first describing the construction and operation of various components which might be incorporated in a system. To this end, FIGS. 1–32 and 34 illustrate such components. One form of the system itself is then illustrated schematically at 2000 in FIG. 33. Another form of the system is, in turn, illustrated at 3000 in FIG. 35.

Regarding the component devices of the system embodying features of the present invention, although they fall generally with the category of fluid power valves, there are no standard or commonly-used fluid power symbols available for abstractly representing them in an automatic control system assembled according to the invention. Since in the present invention these devices provide functions analogous to those provided by components used in a corresponding manner in automatic electrical control systems, however, the abstract symbols and nomenclature commonly used to describe and diagram electrical circuits and components can be and are used. This is one of the many advantages of the system.

Accordingly, a two port, normally blocked relay valve is designated by the same symbol (-||-) which is used to denote an open electrical relay contact; i.e., one which will block the flow of current. A two port normally passing relay valve is designated by the same symbol (-||-) used to denote a normally closed electrical contact; i.e., one which will pass a flow of current. Sets of two-port valves are referred to as poles or contacts. Thus, a relay valve with four sets of two port valves is referred to as a four-pole relay. Symbols for limit valves, time-delay relay valves, pressure sensing valves, push-button valves and selector switch valves will be identical to those normally given corresponding electrical components. With specific reference to the system as a fluid system, the term pressurized fluid as used throughout is intended to include liquids, gases, and vacuum or partial-vacuum conditions.

Figure 1:
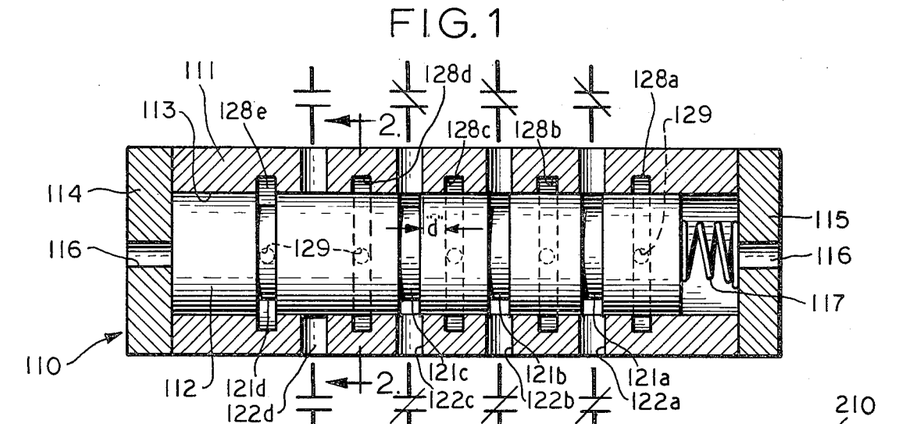
FIG. 1 is a longitudinal sectional view of a four-pole relay.
Figure 2:
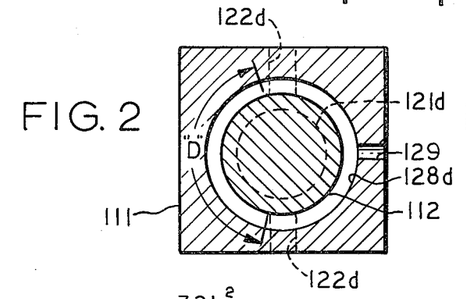
FIG. 2 is a transverse sectional view taken along line 2—2 of FIG. 1.

Now, referring specifically to the drawings, and particularly to FIGS. 1 and 2, a basic component of the system 2000 embodying features of the invention is a multiple pole fluid relay. In FIGS. 1 and 2, a four-pole fluid relay embodying features of the invention is illustrated generally at 110. The relay 110 is designed with one normally blocked pole and three normally passing poles. When it is actuated, in a manner hereinafter discussed, it alternatively provides one passing pole and three blocked poles. As will subsequently be recognized, however, the relay might comprise any number of poles having any combination of normally blocked and passing states.

The relay valve 110 comprises a valve body 111 having a valve spool 112 axially slidable in a valve bore 113 extending through the body 111. Caps 114 and 115 close opposite ends of the bore 113 and each are apertured, as at 116, for reasons hereinafter discussed. A coil spring 117 is disposed between the cap 115 and that end of the spool 112 adjacent the cap 115, effective to normally urge the spool 112 into the position seated against the cap 114, as shown in FIG. 1.

The spool 112 has four annular grooves 121 formed in its outer surface in axially spaced relationship. With the spool 112 "normally" seated against the end cap 114, three of these grooves 121a, 121b, and 121c are in alignment with identical cross passages 122a, 122b, and 122c extending through the valve body 111.

The cross passages 122a-c each define oppositely disposed inlet-outlet ports in the valve body 111. The ports 122a-c associated with the spools annular grooves 121a-c in FIG. 1 are normally passing, as illustrated.

A fourth annular groove 121d is formed in the spool 112 axially spaced from the groove 121c one and one-half times the normal axial spacing of the grooves 121. Accordingly, with the spool 112 positioned as illustrated in FIG. 1, the groove 121d is not in alignment with another set of cross passages 122d or ports in the valve body 111, since the ports 122d are axially spaced uniformly with the ports 122a-c. Thus, the ports 122d are normally blocked.

In a system 2000 (see FIG. 33) embodying features of the invention, the aperture 116 in the end cap 114 of the valve 110 is connected to signal pressure. The aperture 116 in the end cap 115 is, on the other hand, connected to atmosphere in the case of a compressed air system, as this one is.

Application of signal pressure through the aperture 116 in the cap 114 energizes the relay valve 110 and moves the spool 112 against the end cap 115, compressing the spring 117 and changing the state of the individual relay poles. The ports 122d are opened by communication around the groove 121d, while the ports 122a-c are blocked.

Regardless of which position the valve spool 112 is in, however, normally blocked ports, the ports 122d in the valve setting illustrated in FIG. 1, for example, cannot pass signals through leakage of fluid from inlet to outlet around the valve spool 112 circumference. This is true because the valve 110, constructed according to the present invention, has five annular venting grooves 128a-e formed around the inner surface of the valve bore 113 in axially spaced relationship along the length of the bore. Each groove 128a-e is exhausted, vented to atmosphere in the case of an air pressure system, through a vent port 129, best seen in FIG. 2.

The annular venting grooves 128a-e are each spaced axially a predetermined distance $d$ from the next adjacent port 122a-d in the valve body 111. The distance $d$, which is slightly less than one-half the distance axially between adjacent ports 122a-d, is substantially less than the circumferential distance $D$ illustrated in FIG. 2 between opposite ports 122d, for example. Accordingly, leakage fluid takes the shortest path from the inlet port side of the normally blocked ports 122d to either vent passage 128d or 128e. No leakage to the normally blocked outlet port 122d around the spool 112 semi-circumference dimension $D$ can take place and build up pressure in the line connected to that output port. The relay valve 110 thus prevents leakage induced malfunctions with its own "controlled leakage" function. In the system 2000 hereinafter discussed, no false signal can thus be caused by leakage.

With signal pressure on the pressure end of the spool 112, as hereinbefore described, the inlet-outlet ports 122a-c are blocked and the ports 122d are passing. Release of pressure permits the spring 117 to return the spool 112 to its normal position where the reverse is true for each set of ports 122a–d. The annular venting grooves 128a–e connected to corresponding vent ports 129 provide venting isolation between each set of poles and between the signal source inside the cap 114 and the poles 122d.

According to the invention, the valve 110 is constructed so that venting grooves 128a–e bracket corresponding pairs of inlet and outlet ports 122a–d. When the valve 110 shifts state whereby the ports 122a–c become blocked while ports 122d become passing, at no time do the annular spool grooves 121a–d pass over a venting groove 128a–e or place one of them in communication with line pressure at the ports. This is true of every valve and related device hereinafter described embodying the venting feature of the invention.

Figure 3:
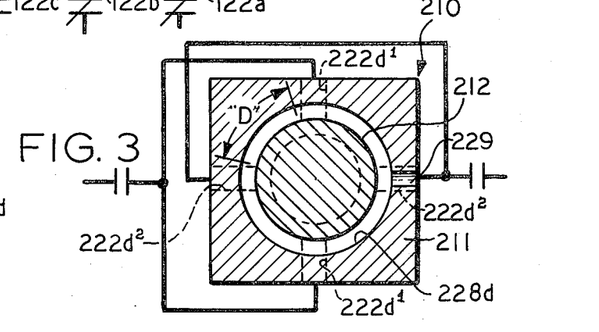
FIG. 3 is a transverse sectional view taken through a four-pole relay similar to that shown in FIGS. 1 and 2, with the relay modified for balanced spool operation with equal opposed pressurized areas.

To achieve a balance of fluid forces and reduce friction in a relay valve such as the valve 110, a balanced arrangement of the input-output ports 122a–d can be built into the valve. Referring to FIG. 3, a valve 210 otherwise identical to the valve 110 but modified to provide this balance is illustrated in section. The secton is taken at the same place in a modified valve 210 as the section 2—2 in FIG. 1. In the valve 210, components corresponding to those of the valve 110 are identified by corresponding reference numerals plus 100 digits.

The valve 210 is characterized by providing two common line inlet-outlet ports $222d^1$ and $222d^2$ at right angles to each other in the same plane disposed transverse to the axis of the valve 210. Similar arrangements of other inlet-outlet ports are provided. Thus, as seen in FIG. 3, the ports $222d^1$, for example, are arranged vertically through the valve body 211 while the ports $222d^2$ are arranged horizontally, and so forth. The vent ports 229 are placed identically to those in the valve 110. The spool 212 is subject to balancing radial pressures along its axis by this arrangement of inlet-outlet ports. The leakage path D is still substantially longer than the path d (see FIG. 1) so no pressure building leakage occurs.

Figure 4:
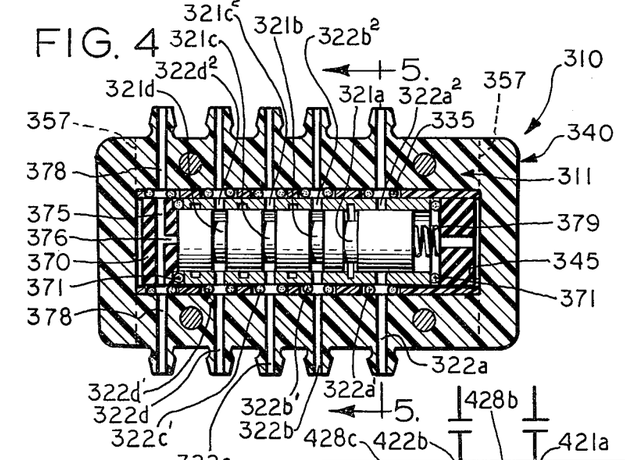
FIG. 4 is a bottom plan view of another form of four-pole relay embodying features of the invention.
Figure 5:
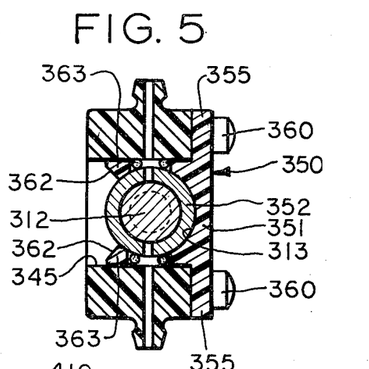
FIG. 5 is a view taken along line 5—5 of FIG. 4.

Another form of relay valve is illustrated generally at 310 in FIGS. 4 and 5. Here components corresponding generally to those of the valve 110 are identified by corresponding reference numerals plus 200 digits.

The relay valve 310 is illustrated as a four-pole fluid relay designed with three normally passing poles and one normally blocked pole. When it is actuated, it alternatively provides three blocked poles and one passing pole.

The relay valve 310 illustrated in FIGS. 4 and 5 provides the controlled leakage feature hereinbefore discussed in relation to other valves embodying features of the invention. It is distinguished from the valve 110 in that it has a modular, "insert" type construction.

The valve body 311 construction includes a box-like molded thermo-plastic housing 340 formed with a cavity 345 extending entirely through it for receiving a body insert 350. The insert 350 includes a plastic receiver member 351, which is generally rectangular in shape and dimensioned to fit freely into the cavity 345 from the upper end of the cavity (the right side as seen in FIG. 5). The receiver member 351, in turn, seats a sleeve 352 and the valve spool 312 in unitary, snap-in relationship.

The member 351 has outwardly extending ears 355 formed adjacent its upper face 356 and these ears overlie the sides of the housing 340, nested between shoulders 357 formed at its opposite ends. The ears 355, and thus the insert 350, are secured in the position seen in FIG. 5 by conventional anchor bolts 360.

The insert receiver member 351 has an open mouth formed in its lower surface, defined by diverging planar surfaces 362, which form an entrance to the insert valve bore 313. With the insert 350 removed from the housing 340, the unitary sleeve 352 and spool 312 can be inserted into the bore 313 by merely pressing it down against the surfaces 362, forcing the resilient plastic sides 363 of the insert outwardly and permitting the spool to snap into place. At their thinnest point, the sides 363 are approximately 0.050 inches thick, in the present illustration. The significance of this dimension will hereinafter be explained. The sleeve 352 and spool 312 can be removed in the same way, of course.

The valve spool 312 has four annular grooves 321a, b, c and d formed therein. Grooves 321b, c and d are evenly spaced, as will be noted, while groove 321a is half again as far from groove 321b.

The valve body housing 340 has four pairs of axially aligned inlet-outlet ports defined by passages 322a, b, c and d formed therein. The passages 322a, b, c and d register with larger diameter passages $322a^1$, $322b^1$, $322c^1$ and $322d^1$ formed through the sides 363 of the insert 350. Seated in each of these larger diameter passages $322a^1$, $322b^1$, $322c^1$ and $322d^1$ are O-rings 335. The O-rings 335 are, in the present instance, 0.070 inches "thick". As a result, these O-rings 335 seat tightly against both outer surface of the sleeve 352 and the inner surface of the housing 340, surrounding the ports 322a–d in sealing relationship.

The sleeve 352 has radial passages $322a^2$, $322b^2$, $322c^2$ and $322d^2$ formed therein which register with and are the same diameter as the body ports 322a, b, c and d. The O-ring seal is established between these passages and ports, as illustrated. The sleeve 352 is keyed against rotation in a suitable manner.

The valve spool 312 is actuated by fluid pressure exerted through a plastic bumper pad 370 at one end of the housing 340. The bumper member 370 is circular in configuration and is snapped into the receiver member 351 similar to the sleeve 352. O-rings 371 bracket the transverse passage 375 extending through it which communicates with an axial passage 376. The passage 375 communicates with pressure ports 378 in the housing 340 through the O-ring seals 371. Fluid pressure at either of the ports 378 is thus effective to actuate the spool 312 and change the state of the valve, against the bias of spring 379 mounted against another bumper pad 380 at the opposite end of the receiver member 351.

Controlled leakage takes place through the vent grooves 328a, 328b, and 328d in a manner described in relation to the embodiment of FIG. 1, for example. Vent apertures (not shown) extend radially through the sleeve to communicate with atmosphere between receiver member sides 363.

Figure 6:
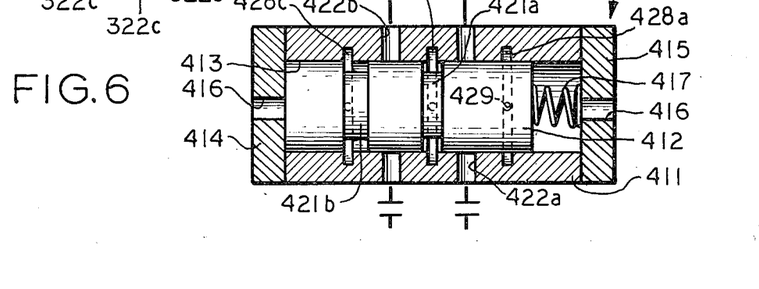
FIG. 6 is a longitudinal sectional view of a relay with displaced contacts.

Turning now to FIG. 6, in some fluid control circuits it is desirable to have signals passed by a multiple pole relay wherein the signals are slightly out of time-phase. The relay valve 410 is capable of producing such a result, and embodies features of the invention. Once again, valve components corresponding to those of previously described valves bear corresponding reference numerals plus an additional 100 digits.

The relay valve 410 comprises a body 411 having a spool 412 slideable in a bore 413, with caps 414 and 415, apertured at 416, closing the bore ends. A coil spring 417 normally biases the spool 412 against the cup 414.

The valve 410 is a two-pole relay with both poles normally blocked. The spool 412 contains two annular grooves 421a and 421b, axially spaced from each other a predetermined distance less than the axial distance between two sets 422a and 422b of radially extending ports. As a result, communication between the ports 422b through the annular groove 421b takes place before communiction by the ports 422a is opened through groove 421a as the spool 412 moves to the right in FIG. 6.

According to the invention, the valve 410 also prevents transmission of leakage signals. To this end, annular grooves 428a, b and c vented radially of the body 411 through apertures 429 are provided. Once again, since a pneumatic system is under consideration here, the apertures 429 vent to atmosphere.

Figures 7, 8, 9:
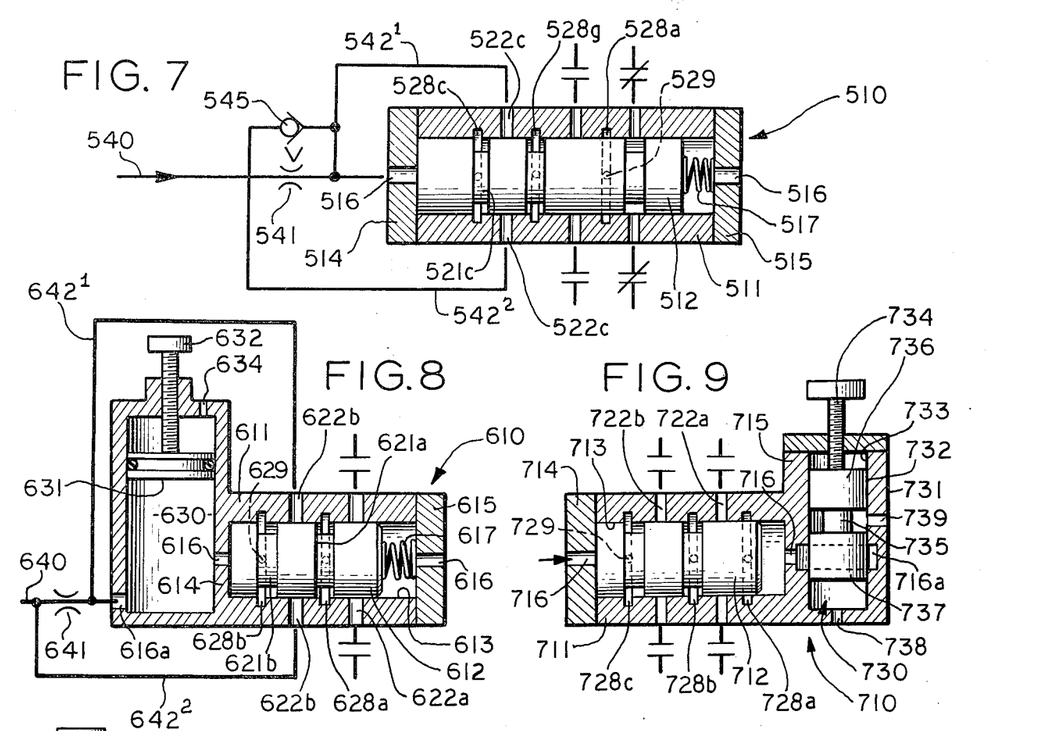
FIG. 7 is a longitudinal sectional view of a snap-action, time delay relay.
FIG. 8 is a longitudinal sectional view of another embodiment of a snap-action, time delay relay.
FIG. 9 is a longitudinal sectional view of a snap-action, pressure control relay.

The valve 510 illustrated in FIG. 7 is broadly similar to the valve 410 in that it is constructed and arranged for operation of poles out of time-phase. In the valve 510, which defines a two-pole relay, with one of the poles normally passing and the other normally blocked, the "early" communication of a leading set of poles is utilized to initiate what is known as "snap action" operation.

With the valve 510, a fluid input signal line 540 is connected to aperture 516 in the end cap 514 of the valve body 511 and has a restricted flow orifice 541 of conventional construction disposed in it. The ports 522c forming the leading set of poles are connected back to the input line 540 by return lins $542^1$ and $542^2$. The line $542^2$ returns unrestricted to the line 540 upstream of the orifice 541. The line $542^1$ returns unrestricted to the line 540 downstream of the orifice 541 through one of its branches and to a point upstream of the orifice through another of its branches containing a check valve 545.

In operation, when incoming fluid pressure is applied in the line 540, fluid under pressure flows through the restricting orifice 541 at a prescribed slow rate and gradually urges the spool 512 to the right against the bias of spring 517. When the groove 521c reaches the ports 522c, incoming fluid from the line $542^2$ by-passes the orifice 541 through the line $542^1$ into the input line 540 downstream of the orifice. Movement of the spool 512 is rapidly accelerated toward the end cap 515.

Upon removal of fluid pressure in the input line 540, the pressurized fluid in the line $542^1$ by-passes the restricted orifice 541 through the check valve 545 to instantaneously release the spool 512 and permit it to return under the urging of the spring 517. The valve 510 prevents transmission of leakage signals in a manner identical to the valve 410. Venting grooves 528a, b and c and venting apertures 529 vent leakage to atmosphere.

Referring now to FIG. 8, another time-delay relay valve is illustrated generally at 610. Again, generally corresponding components are identified by reference numerals corresponding to those previously used on the various valve components of the valves 110, 210, 310, 410 and 510 hereinbefore discussed, plus yet another 100 digits. Accordingly, the 600 series of digits is utilized as reference numerals as the 700, 800, etc. series will subsequently be used on other spool valve constructions embodying features of the invention.

The valve body 611 in this case includes a spool 612 slidable axially in the bore 613 closed at one end by an end wall 614 and at the other end by a cap 615. Apertures 616 are provided in the wall 614 and cap 615 and a coil spring 617 normally urges the spool 612 toward the wall 614.

Opposite the wall 614 from the spool 612 in the body 611 is a variable volume chamber 630 in a suitable housing. The chamber 630 volume is made variable by a vertically movable upper wall 631 having an annular O-ring seal and a manual, screw 632 adjustment. The housing above the wall 631 is vented to atmosphere through an aperture 634.

An inlet pressure line 640 is connected through a restricted orifice 641 to an aperture 616a in the variable volume chamber 630. Return lines $642^1$ and $642^2$ connect ports 622b in the valve body 611 to the inlet line 640, the line $642^1$ downstream of the orifice 641 and the line $642^2$ upstream of the orifice 641.

The cross-sectional area of the spool 612 and the spring force exerted by the spring 617 are so related that when pressure is applied to the inlet line 640, the spool 612 will move to the right to compress the spring 617 at some time before the pressure in the chamber 630 reaches a value which establishes a ratio to the value of the incoming signal pressure known as the "critical back pressure ratio." This ratio is 0.53 for compressed air. In explanation, the rate of flow of a gass between two chambers is constant until the downstream pressure reaches a ratio to the upstream pressure equalling the critical back pressure ratio. At this point, the rate of flow becomes proportional to the pressure differential between the chambers until the pressure is equalized.

Thus, the time-delay before operation of the valve 610 is initiated will be proportional to the volume of the chamber 630, with the cross-sectional area of the spool 612 and the spring force of the spring 617 being fixed. Adjustments in this volume will proportionally vary the time required for the spool 612 to shift to shift once pressure is imparted to the input line 640.

Again, the axial spacing of the grooves 621a and 621b in the spool 612 is slightly less then the axial spacing of the ports 622a and 622b. Accordingly, the groove 621b affords communication through the port 622b before the ports 622a communicate through the groove 621a. Snap action of the spool follows by the immediate introduction of full-line pressure through the line $642^1$ downstream of the orifice 641 in a manner hereinbefore discussed in relation to the valve 510. Venting to atmosphere without leakage through normally closed ports is again afforded by venting grooves 628a and 628b, and apertures 629, in a manner also discussed previously.

A variable pressure control relay valve 710 embodying features of the invention is illustrated generally in FIG. 9. The valve 710 is a two-pole relay valve with both poles normally blocked. The valve 710 includes a body 711 having a spool 712 slidable in its bore 713. An end cap 714 closes one end of the bore 713 and a wall 715 closes the other end of the bore, the cap 714 and wall 715 each being apertured at 716.

The wall 715 forms one side of a pressure divider unit 730 comprising a body 731 having a spool 732 vertically adjustable in a bore 733 by an adjustment screw 734. The spool 732 has an annular groove 735 formed intermediate its opposite ends which defines lands 736 and 737 on opposite sides of the groove.

The bore 733 below the land 737 is vented to atmosphere at 738. A pressure inlet port 739 to the bore 733 in alignment with the annular groove 735 in the spool 732 is provided in the body 731. An annular recess 716a is formed around the inner surface of the bore 733 in alignment with the aperture 716 to the bore 713 of the valve body 711.

In operation, a known or standard fluid pressure is introduced to the pressure divider body 731, at the groove 735, through the port 739. Fluid under pressure leaks along the surface of the land 737 to the recess 716a and communicates through the aperture 716 to the valve bore 713 at the end of the valve spool 712 opposite the pressure inlet port 716 in the cap 714. The pressure developed in the valve body 711, and effective on the valve spool 712 in this way, is proportional to the length of the spool land 737 in engagement with the bore 733 between the recess 716a and the groove 735. It will be recognized that this contact length can be adjusted readily with the screw adjustment 734. Thus, an adjustable pressure is provided to be used as a standard against which an incoming signal at the aperture 716 in the cap 714 can be compared.

In operation, beginning with no signal pressure in the cap 714, the spool 712 is held against the cap by the standard pressure, as pre-adjusted. When signal pressure at the aperture 716 in the cap 714 reaches the adjusted standard pressure, the spool 712 moves to the opposite end of the bore 713 against the wall 715, changing the state of the relay poles 722a and 722b. When the signal pressure is removed, the spool 712 returns to its original position.

According to the invention, the valve body 711 is again provided with venting grooves 728a, 728b and 728c. These grooves vent to the atmosphere through apertures 729 and provide leakage paths which prevent transmission of leakage fluid through normally blocked ports 721a and 721b.

Figure 10:
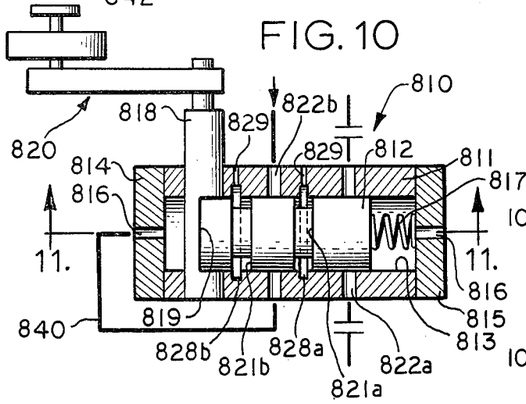
FIG. 10 is a longitudinal sectional view of a cam operated, snap-action fluid limit valve.
Figure 11:
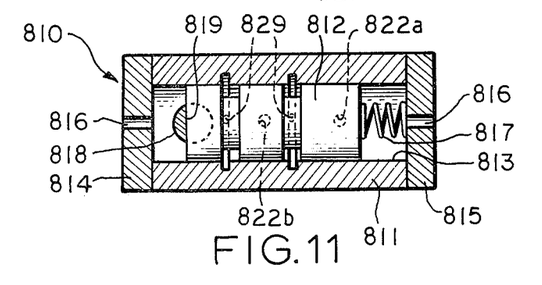
FIG. 11 is a sectional view taken along line 11—11 of FIG. 10.

Referring now to FIGS. 10 and 11, a limit valve embodying features of the invention and having snap action capability is illustrated generally at 810. The valve is a cam-actuated, single-pole valve with the single pole or contact normally blocked. The valve 810 includes a body 811 having a spool 812 slidable in its bore 813. An end cap 814 closes one end of the bore 813 and an end cap 815 closes the opposite end. The caps 814 and 815 are each apertured at 816.

A coil spring 817 between the cap 815 and the spool 812 urges the spool into engagement with a cam actuator shaft 818, or rather the flat cam surface of a cut-out 819 in the shaft. Rotation of the shaft 818 by a cam roller mechanism 820 is effective to move the spool 812 toward the cap 815 against the bias of the spring 817.

The spool 812 has two annular grooves 821a and 821b formed in its outer surface in axially spaced relationship. For reasons hereinafter discussed, the groove 821b is substantially wider than the groove 821a, as will be noted. With the spool 812 in its normal, uncammed position, the groove 821a is displaced to the left of cross-passages 822a, as seen in FIG. 10. In turn, the groove 821b is displaced to the left of a cross-passage 822b. The grooves 821a and 821b are in axial alignment, in this position, with annular venting grooves 828a and 828b in the bore 813. The grooves 828a and 828b are vented to atmosphere, in the case of an air pressure system, through identical vent ports 829.

When the fluid motor piston rod which positions a cutting tool, for example, reaches a prescribed limit and engages the roller mechanism 820, it rotates the shaft 818, moving the spool 812 against the bias of the spring 817. Before the groove 821a becomes aligned with the cross-passages 822a, which define the inlet-outlet ports of the valve's single pole, the wider groove 821b reaches the cross-passages 822b. The inlet side of the cross-passages 822b is connected to signal pressure so that when the groove 821b reaches it, signal pressure immediately is effective in line 840, through the aperture 816 in the cap 814, on the end of the spool 812 opposite the spring 817. The spool 812 is immediately snapped against the cap 815, fully compressing the spring 817, and aligning the groove 821a with the cross-passages 822a. The inlet-outlet ports defined by the cross-passages 822a become passing, and fluid under pressure is transmitted through the valve to a power valve or the like.

When the piston rod retracts, assuming signal pressure has been removed from cross-passage 822b, the spring 817 is effective to drive the spool 812 against the flat surface of the groove 819 in the shaft 818, rotating it back to its normal position. The ports 822a are immediately blocked and fluid flow through the valve stops. The limit valve 810 is in its normal, blocked state once again.

With the valve in its normal, blocked state, it cannot malfunction by passing fluid under pressure from inlet to outlet ports 822a because it is constructed according to the invention to provide a controlled leakage path. More precisely, the leakage path axially of the valve bore 813 between the cross-passages 822a and the venting groove 828a is shorter than the semi-circumferential distance around the spool 812 between these inlet-outlet ports. The same is true of the distance axially of the bore 813 between the cross-passages 822b and the venting groove 828b, so that inadvertent snap action of the valve into its passing state cannot be effected by pressure leakage across the ports 822b.

Figure 12:
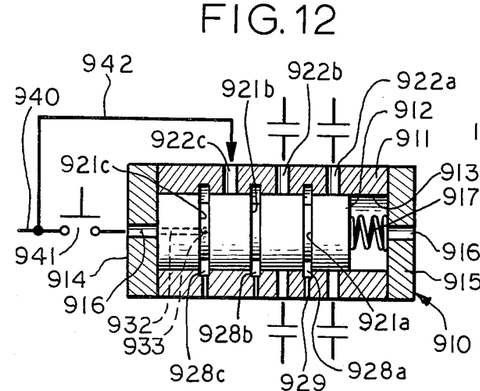
FIG. 12 is a longitudinal sectional view of a fluid control relay with an internal latching contact.

A two-pole fluid control relay valve with an internal latching path is illustrated generally at 910 in FIG. 12. The valve 910 comprises a valve body 911 having a valve spool 912 axially slidable in a valve bore 913 extending through the body 911. Caps 914 and 915 close opposite ends of the bore 913 and each are apertured, as at 916. A coil spring 917 disposed between the cap 915 and that end of the spool 912 is effective to urge the spool 912 toward the cap 914.

The spool 912 has three annular grooves 921a, 921b and 921c formed in its outer surface in axially spaced relationship. With the spool 912 seated against the end cap 914, these grooves 921a, 921b and 921c are out of alignment with cross-passages 922a and 922b, and single radial passage 922c, respectively. In this position of the spool, the grooves 921a, 921b and 921c are in alignment with annular venting grooves 928a, 928b, and 928c, respectively, in the valve bore 913. These venting grooves are vented to atmosphere through corresponding vent ports 929.

Extending axially through the spool 912, from the end of the spool adjacent the cap 914, is a passage 932. The passage 932 joins a radial passage 933 in the spool which opens into the groove 928c, as illustrated.

A signal pressure line 940 is connected to the aperture 916 in the cap 914 through a normally blocked push-button valve 941. By-passing the push-button valve 941 and connected to the single radial passage 922c is a signal line 942.

When a pressure signal is applied to the signal port 916 by closing the push-button valve 941, the spool 912 moves to the right against the bias of the spring 917. The passages 932 and 933 are not large enough to permit sufficient pressure build-up to prevent this actuation. With the spool 912 in its actuated position, an alternate source of pressure for maintaining it in this position is provided through the line 942, the single radial passage 922c, the groove 921c, and the passages 932 and 933. This is true even though the push-button valve 941 is released and becomes normally blocked again. Since only leakage from the pilot port 916 to the venting groove 928c must be made up to maintain the relay in the energized state, the passage way 932 and 933 can be very small in diameter; i.e., less than 0.05 inches.

With the spool 912 in its actuated position, the two sets of ports 922a and 922b are in their passing state. When the valve 910 is once again in its normal, unactuated state, the controlled leakage function of the grooves 928a, 928b and 928c, with their venting apertures 929, prevents malfunctions according to the invention in a manner hereinbefore discussed.

Figure 13:
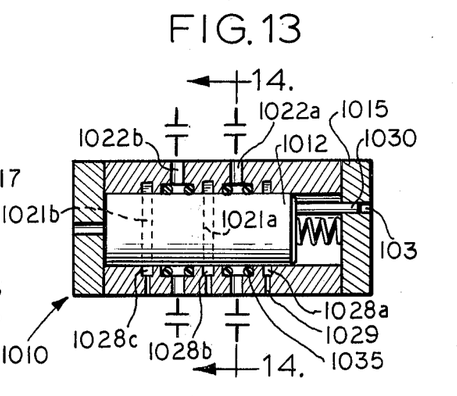
FIG. 13 is a longitudinal sectional view of a relay with elastomeric seals and a spool orientation pin.
Figure 14:
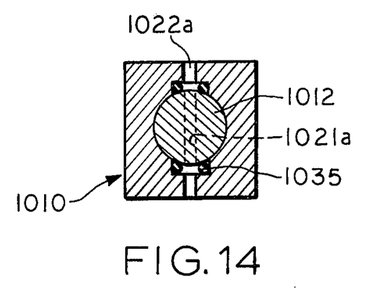
FIG. 14 is a transverse sectional view taken along line 14—14 of FIG. 12.

The relay valve 1010 illustrated in FIGS. 13 and 14 provides the controlled leakage feature hereinbefore discussed in relation to other valves embodying features of the invention. It is distinguished from valve 110, for example, substantially only in the fact that it embodies diametral passages 1021a and 1021b in the spool 1012 rather than annular grooves. As a result, the spool 1012 must be fixed against rotation about its axis and this is accomplished by a pin 1030 fixed to the end of the spool 1012 and received in an aperture guide 1031 in the cap 1015 of the valve.

In addition, the cross-passages 1022a and 1022b defining the inlet-outlet ports of the two-pole relay valve are sealed relative to the spool 1012 by small O-rings 1035 seated in counterbores encircling the cross-passages. Controlled leakage or venting grooves 1028a, 1028b and 1028c communicate with the atmosphere through venting ports 1029.

Figure 15:
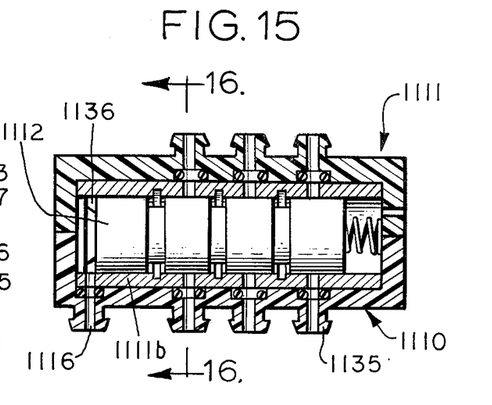
FIG. 15 is a longitudinal sectional view of a cartridge type relay with integral tube connectors on the housing.
Figure 16:
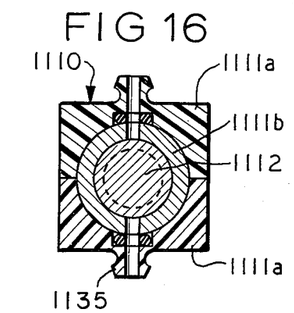
FIG. 16 is a transverse sectional view taken along line 16—16 of FIG. 15.

FIGS. 15 and 16 illustrate a three-pole relay valve 1110 also providing the controlled leakage feature of the invention. In essence, it is distinguished from the relay valve 110 substantially only in that it comprises molded plastic shell segments 1111a bonded together around a metal sleeve body 1111 with O-ring seals therebetween. The spool 1112 is slidable in the sleeve body 1111.

As illustrated, fluid porting to the body 1111 is afforded through integrally molded port fittings 1135. An elastomeric ring 1136 at the end of the spool 1112 opposite the coil spring 1117 is provided as a spool stop and also prevents leakage of pressurized fluid when signal fluid is applied at the signal port 1116.

Figure 17:
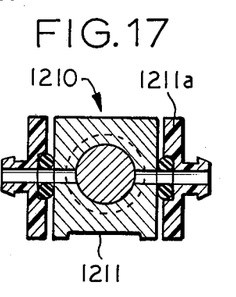
FIG. 17 is a transverse sectional view taken through an alternate form of cartridge type relay.
Figure 18:
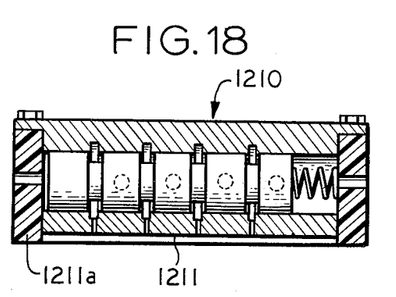
FIG. 18 is a longitudinal sectional view of the relay shown in FIG. 17.

The four-pole relay valve 1210 illustrated in FIGS. 17 and 18 is quite similar to the valve 1110. It is also constructed according to the invention insofar as providing controlled leakage to prevent malfunction is concerned. In essence, it is distinguished from the relay valve 1110 only in that it is a four-pole relay and employs a metal body 1211 and a spool 1212 mounted in a thermo-plastic housing 1211b. As in the valve 1110 of FIG. 15, O-rings are used to seal between the housing 1211a and the body 1211. Approximately .005 inch clearance between the body 1211 and housing 1211a assures stress isolation of the body when the housing is mounted.

FIGS. 19–25 illustrate slide relay valves embodying features of the invention. Since these valves are basically different than the spool valves, the reference numeral correspondence hereinbefore discussed does not apply. One form of slide relay valve embodying features of the invention is a two-pole relay valve illustrated generally at 1310 in FIGS. 19–22 and another two-pole relay is illustrated generally at 1410 in FIGS. 23–25.

Figure 19:
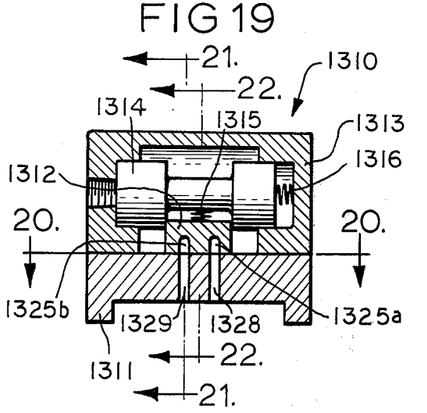
FIG. 19 is a longitudinal sectional view of a slide valve type relay.

The slide relay valve 1310 comprises a sub-plate 1311, a slider 1312, a cover plate 1313, an actuator piston 1314, and a pair of coil springs 1315 and 1316.

Referring first to the sub-plate 1311, it will be seen that two pairs of elongated apertures 1321a and 1321b are formed in its upper surface. The apertures 1321a communicate through passages 1322a with the exterior of the sub-plate 1311 where they form the inlet-outlet ports for one-pole or contact of the valve. The apertures 1321b communicate in the same way with the exterior of the plate 1311 by passages 1322b which form the inlet-outlet ports of the second pole or contact.

Venting passages 1328 and 1329 extend vertically through the sub-plate 1311 to its upper surface, as illustrated, and are displaced longitudinally of the sub-plate from both pairs of apertures 1321a and 1321b. The distance $d$ between the passage 1328 opening and either of the ports 1321a is less than the distance D between opposite ones of the ports 1321a, however, as will be noted. The same relationship exists between the venting passage 1329 opening and the apertures 1321b.

Figure 20:
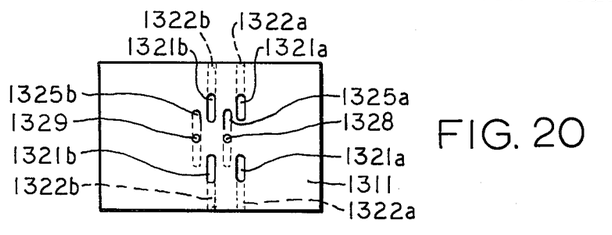
FIG. 20 is a sectional view taken along line 20—20 of FIG. 19 showing, for purposes of illustration, the position of slot chambers in the lower surface of the slider.
Figure 21:
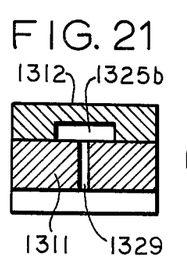
FIG. 21 is a transverse sectional view taken along line 21—21 of FIG. 19.
Figure 22:
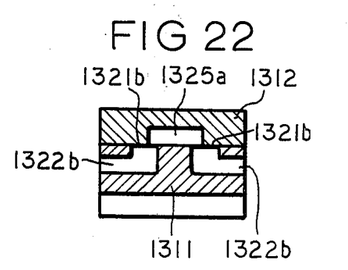
FIG. 22 is a transverse sectional view taken along line 22—22 of FIG. 19, with the slider actuated.

The slider 1312 has two transversely elongated slot chambers 1325a and 1325b formed in its lower surface. The opposed surfaces of the sub-plate 1311 and the slider 1312 are precision lapped to provide a sliding seal by techniques well-known in the art.

In its de-energized or blocked state, the slot chambers 1325a and 1325b are aligned with an in communication with the vent passages 1328 and 1329, respectively. In this blocked state, because of the relatively shorter distance $d$ than the distance between opposed ports D, an alternate venting leakage path is provided which prevents a pressure signal at a normally blocked inlet port from communicating with its corresponding output port or with an adjacent set of ports.

Figure 23:
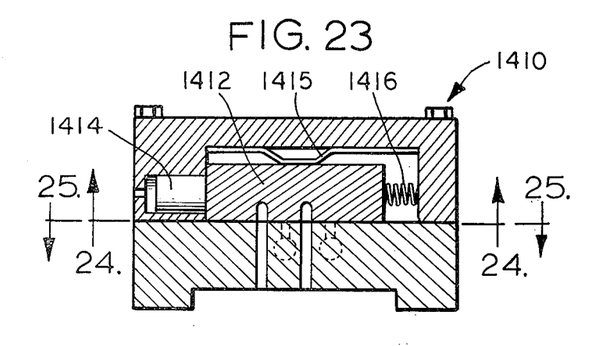
FIG. 23 is a longitudinal sectional view of another form of slide valve type relay.
Figure 24:
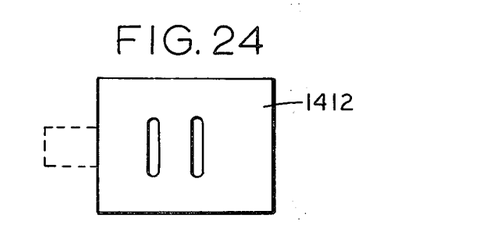
FIG. 24 is a sectional view taken along line 24—24 of FIG. 23.
Figure 25:
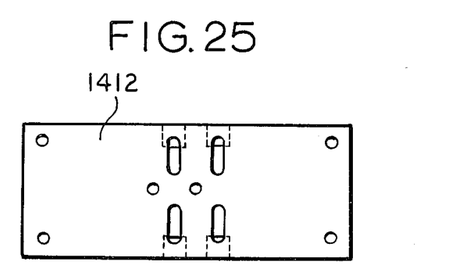
FIG. 25 is a sectional view taken along line 25—25 of FIG. 23.

The slide valve 1410 illustrated in FIGS. 23–25 is quite similar in construction to the valve 1310 illustrated in FIGS. 19–22. Its slider 1412 is moved by an end mounted piston 1414 against the bias of a coil spring 1416, and is held down by a leaf spring 1415. The operation and advantages inherent in the valve construction 1410 embodying features of the invention are substantially identical to those of the valve 1310.

Figure 26:
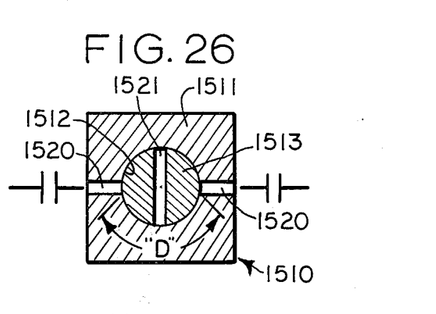
FIG. 26 is a transverse sectional view of a rotary fluid selector valve.
Figure 27:
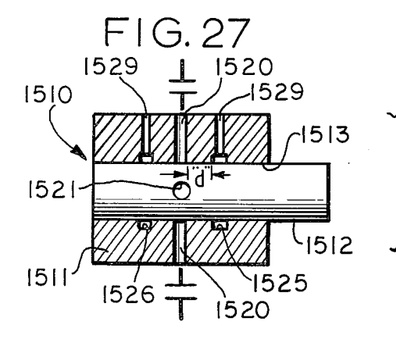
FIG. 27 is a longitudinal sectional view of the valve shown in FIG. 26.
Figure 28:
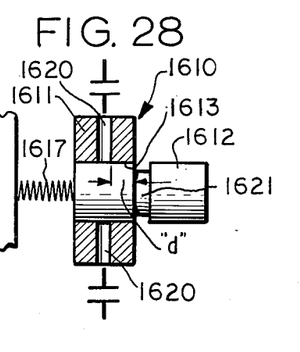
FIG. 28 is a longitudinal sectional view of a two-position push-button valve in its normally blocked position.
Figure 29:
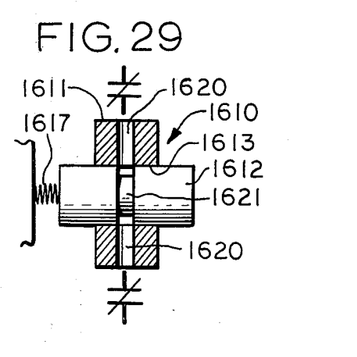
FIG. 29 is a view similar to FIG. 28 with the valve in its normally passing position.
Figure 30:
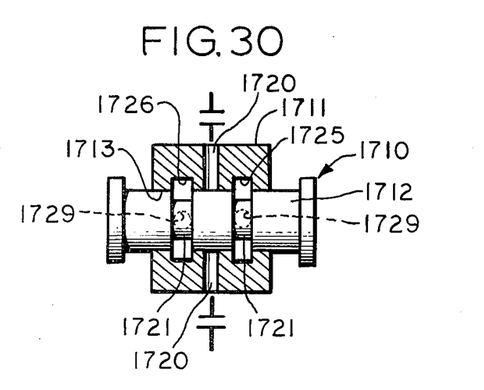
FIG. 30 is a longitudinal sectional view of a three-position push-button valve in its normally blocked position.
Figure 31:
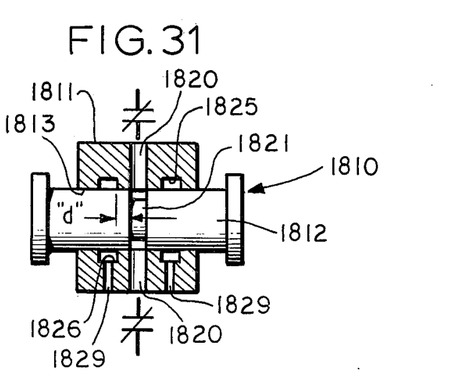
FIG. 31 is a longitudinal sectional view of another form of a three-position push-button valve; .

The valves illustrated in FIGS. 26–31 may be characterized as mechanically operated control valves. The valve 1510 illustrated generally in FIGS. 26–27 is a rotary selector valve. The valve 1610 illustrated in FIGS. 28 and 29 is a two-position, spring-return, push-button valve. The valve 1710 illustrated in FIG. 30 is also a push-button valve, but can be actuated in either direction. The valve 1810 illustrated in FIG. 31 is also a double-acting valve, but is a normally passing control valve.

Referring again to FIGS. 26 and 27, the valve 1510 comprises a valve body 1511 having a cylindrical bore 1513 therein. A rotary spool 1512 is received in the bore and the spool and bore are precision machined for sealing engagement.

The bore 1512 is intersected by cross-passages 1520 which define the inlet and outlet ports of the valve. The spool 1512 is equipped with a cross-passage 1521 for purposes of establishing communication between the inlet and outlet ports 1520 when the spool is rotated to line the cross-passage 1521 up with these ports. Symmetry allows either port to function as an inlet port or an outlet port, of course.

As seen in FIG. 27, annular grooves 1525 and 1526 are formed in the bore 1513, axially spaced from the ports 1520 by a distance $d$. These annular grooves are vented to atmosphere, in the case of a pneumatic device, through the corresponding vent holes 1529.

It will be seen that the segmentally circumferential distance D between opposite ports 1520 around the spool 1512 is greater by a substantial distance than the distance $d$. In the normally blocked state of the valve 1510, the leakage path from the pressurized port 1520 to the grooves 1525 or 1526 is thus substantially shorter than the leakage path to the opposite port. Thus, controlled leakage to vent prevents the pressurized fluid from reaching the unpressurized port and inadvertently actuating a machine tool, for example.

The push-button valve 1610 comprises a valve body 1611 having a bore 1613 therethrough. A spool 1612 is axially movable through the bore against the bias of a coil spring 1617. Transversely extending passages 1620 in the body 1611 define inlet-outlet ports. An annular groove 1621 on the spool 1612 places the normally blocked ports 1620 in communication with each other, thus changing the valve state from blocked to passing, when the spool is moved to the position shown in FIG. 29, against the bias of spring 1617.

With the valve in its normally blocked state, however, the leakage distance between ports 1620 is substantially the same as the segmentally circumferential distance D illustrated in FIG. 26, for example. On the other hand, the leakage path from either one of the ports 1620 to atmosphere, axially along the bore 1613, is substantially less, as indicated at $d$. Accordingly, controlled leakage from a pressure port to atmosphere in the normally blocked valve 1610 is provided according to the invention to prevent system malfunction.

Referring now to FIG. 30, the double-acting push-button valve 1710 comprises a body 1711 having a bore 1713 in which a spool 1712 is axially slidable. Transversely extending passages 1720 define inlet and outlet ports through the body 1711. The spool 1712 has two axially spaced, annular grooves 1721 formed therein. With the valve in its normally blocked state these grooves 1721 are axially aligned with annular venting grooves 1725 and 1726 formed in the bore 1713. The venting grooves are vented to atmosphere, in the case of a pneumatic system, through venting ports 1729.

With the valve 1710 in its normally blocked state, as illustrated in FIG. 30, the leakage paths from either one of the ports 1720 to either one of the venting grooves 1725 or 1726 is substantially shorter than the segmentally circumferential leakage path around the spool 1712 between the ports. Accordingly, controlled leakage to atmosphere takes place, forestalling leakage between the ports with possible system malfunction results.

The valve 1810 illustrated in FIG. 31 is a normally passing, double-acting push-button valve. Its body 1811 has a bore 1813 extending therethrough and a spool 1812 axially slidable in the bore. The body 1811 has aligned transverse passage 1820 therethrough which form inlet and outlet ports communicating with the bore 1813.

A single annular groove 1821 is formed around the spool 1812 substantially intermediate its ends. With the groove 1821 aligned with the ports 1820 as illustrated in FIG. 31, the valve is normally passing.

Bracketing the ports 1820 in the bore 1813 are a pair of annular venting grooves 1825 and 1826. The venting grooves 1825 and 1826 are vented to atmosphere, for example, through the venting ports 1829.

With the valve 1810 in its normally passing state, obviously leakage is not a factor. When it is moved to either of its two positions wherein the valve is in a blocked state, however, without the annular venting grooves 1825 and 1826 it would be possible for fluid under pressure to leak between ports 1820 and inadvertently activate a machine tool, for example. With the valve 810, regardless of which position the spool is in the axial distance $d$ between the ports 1820 and a venting groove 1825 or 1826 is substantially less than the segmentally circumferential distance around the spool 1812 between ports. Controlled leakage to vent is provided, forestalling malfunction.

The valves discussed as embodying features of the invention are all utilized in systems such as the system 2000 (see FIG. 33), interconnected with pressure sources and power devices, for example, by fluid conduits. In this regard, invention also is embodied in a connection between such conduits and valve fittings, for example.

Figure 32:
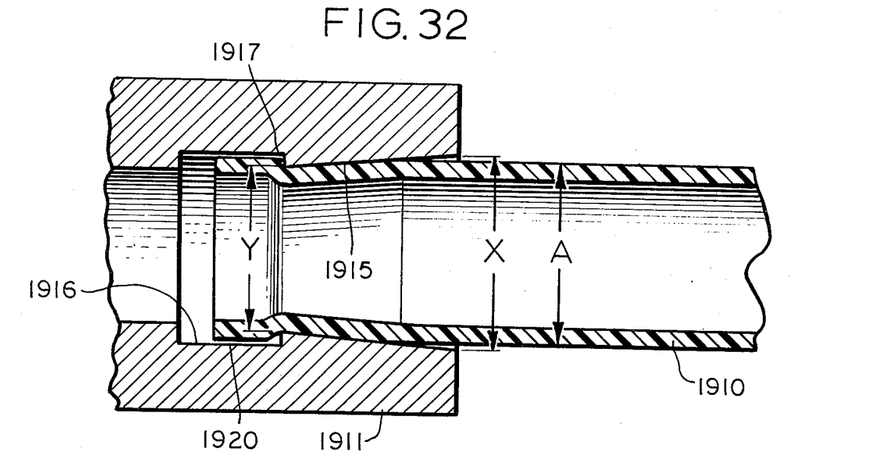
FIG. 32 is a longitudinal sectional view of a fluid conduit fitting assembly embodying features of the invention.

Referring to FIG. 32, a connection is illustrated between the free end of a thermo-plastic conduit tubing 1910 and a fitting 1911 in a valve body or the like. The fitting 1911 has a frusto-conical bore section 1915 formed at the free end, with a taper of 2½° (5° included angle). At the inner end of the bore section 1915 is a larger diameter bore section 1916, cylindrical in cross-sectional configuration, forming an annular shoulder 1917 between the bore sections.

The inside diameter of the frusto-conical bore section 1915 at its outer or free end is X. The inside diameter at the inner end of the frusto-conical bore section 1915, adjacent the shoulder 1917, is Y. Y is smaller than X.

As illustrated, the end of the thermo-plastic tubing 1910 extends through the opening at the free end of the frusto-conical bore section 1915, into the larger diameter bore section 1916. The outside diameter of the thermo-plastic tubing 1910 is A. The dimension A is greater than the dimension Y but less than the dimension X.

In operation, the free end of the tubing 1910 is inserted freely into the open end of the frusto-conical bore section 1915. As the tubing 1910 is forced inwardly, interference results and the free end of the tubing is radially compressed until it reaches and is forced past the shoulder 1917. At this point, the free end of the tubing 1910 expands radially behind the shoulder 1917, as seen at 1920.

Fluid pressure in the tubing 1910 forces the tubing to seat tightly within the frusto-conical bore section 1915, against its surface, and also to seat tightly against the circular edge of the shoulder 1917. The tubing 1910 is, in effect, locked in the fitting 1911. A substantial amount of force is necessary to pull the tubing 1910 out of the fitting 1911. The tubing 1910 is retained by a substantial retention force even when there is no fluid pressure within the tubing.

Figure 33:
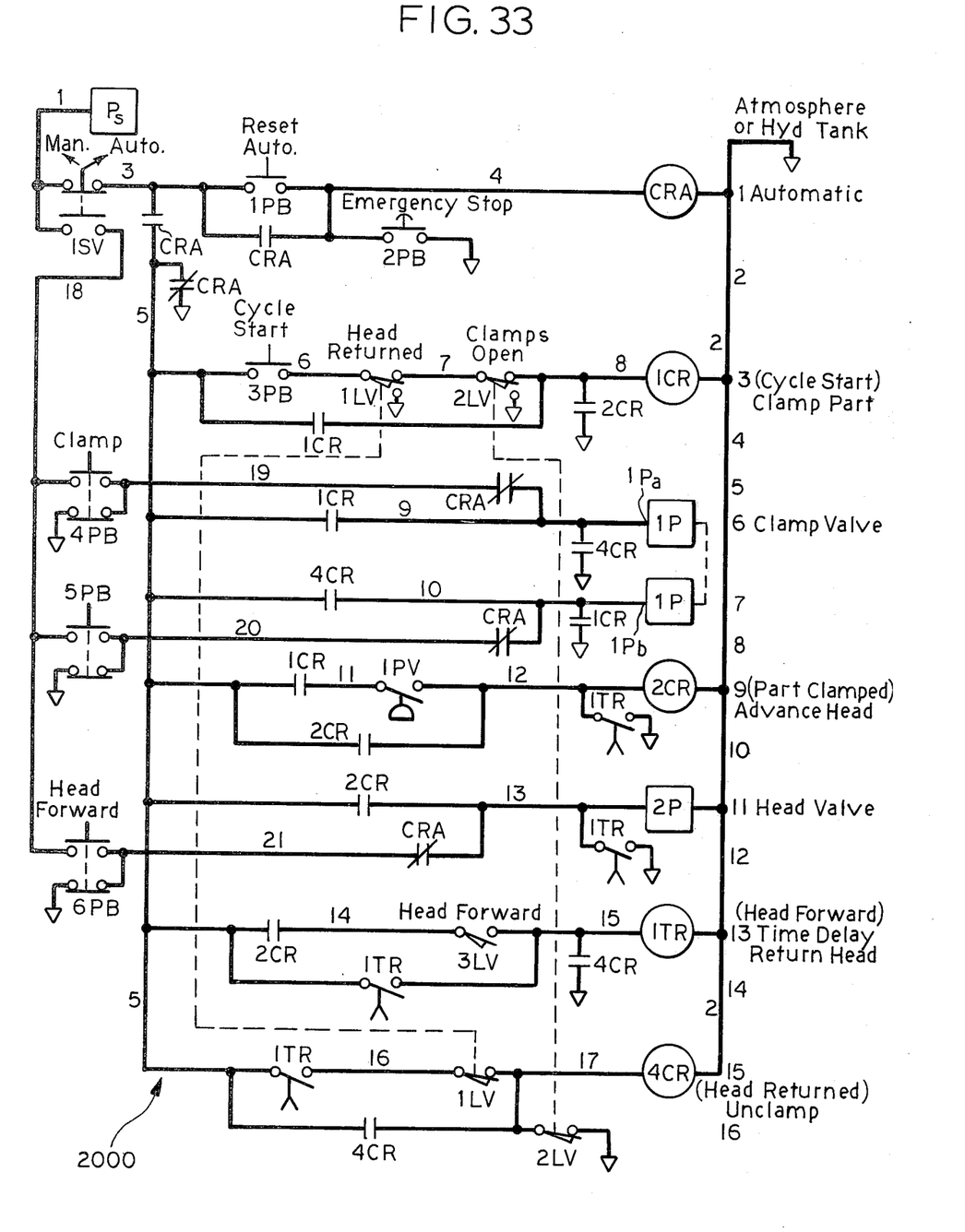
FIG. 33 is a schematic diagram of an automatic fluid control system embodying features of the invention.

Employing one or more of the aforesaid valve devices or modifications thereof, including a multiple pole relay valve such as shown at 110 in FIGS. 1 and 2, for example, an automatic fluid control system embodying features of the present invention can readily be constructed. FIG. 33 is a schematic diagram of a relatively simple automatic fluid control system 2000 for a typical industrial application.

In keeping with the foregoing discussion of advantageous features of the invention, standard electrical symbols have been used to identify components in the control system 2000. All of the components have been labeled with appropriate symbols and each separate fluid flow path within the control system has been given an identifying number 1, 2, 3, etc. shown in this manner: —2—, for example, also corresponding to standard electrical practice. In addition, to facilitate fast and simple reference to various flow paths, valves and functions of the system 2000, a series of numbered reference lines 1–16 are disposed down the right side of the system schematic. The following description refers to these lines.

The system 2000 is schematically illustrated as inclusive of only the "signal" circuit, in accord with standard industry practice. The "power" circuit is not illustrated. As is well-known, however, it is understood that the power components receive fluid under pressure from the power source and discharge it to exhaust; i.e., atmosphere or tank.

First, the system 2000 includes a source of fluid under pressure identified by the reference letter $P_s$. This system pressure source $P_s$, which might be an air compressor and reservoir, supplies the system 2000 through the flow path 1 (line 1).

A flow path 2 provides the system's connection to atmosphere. In this light, it has been pointed out that the invention is being described in terms of an air pressure system and, in such case, the flow path 2 is connected to atmosphere. When a hydraulic system is used, however, the flow path 2 would be connected to a hydraulic tank or a hydraulic reservoir.

For case of description and clarity, the exhaust flow path 2 is shown with a triangular symbol ∇ attached to its free end. In description of the system 2000, all flow paths with this symbol ∇ attached at a free end are understood to be connected to the exhaust flow path 2; i.e., to atmosphere in the present description or to a tank reservoir in a hydraulic system, for example.

The system 2000, as will hereinafter be explained in detail, contains a plurality of multiple pole relay valves embodying features of the invention. These relay valves are, in this system, of the type illustrated at 110 in FIGS. 1 and 2. With the system 2000 at rest, as shown in FIG. 33, all relay valves are in their de-energized state. The system 2000 also contains push-button valves and limit valves. The limit valves in the system are shown with the machine elements of the system in position to start the next machine cycle.

The automatic machine cycle selected for illustration in the system 2000 is typical of many which might be controlled by a system embodying features of the invention. Initially, a metal part to be machined, for example, is placed in position manually in a machine tool. The machine operator then depresses a start button in the system 2000, causing the machine to clamp the part in a prescribed working position. After the part has been clamped, a machining head moves forward to drill or bore a hole, for example. When the machining head reaches its full forward position, a time-delay is effected by the system 2000 to insure that the drilling operation is completed. The machining head then automatically retracts and the part is unclamped. The operator then manually removes the workpiece.

As has been pointed out, the system 2000 described is a relatively simple one designed for an actual industrial application. It actually comprises multiples of a basic system circuit embodying features of the invention. A virtually unlimited variety of systems embodying features of the invention, each of which is considerably more simple, maintenance-free, and less expensive then generally similar fluid control systems hereinbefore known, can be assembled from the basic components and systems of the invention.

Turning now to a description of the arrangement of components and operation of the system 2000, with the control system power source $P_s$ connected to flow path 1, and a selector valve 1SV in the "auto" position shown, fluid under pressure is present in the flow path 1 and the flow path 3. Manual actuation of a spring-returned push-button valve 1PB (line 1) allows fluid to enter the flow path 4 and energize the control relay valve CRA. Two normally blocked contacts of the relay valve CRA change to their passing state, one permitting fluid under pressure to enter the flow path 5 and the other (line 2) completes an alternate fluid flow path to the valve CRA to hold it in its energized state even though the push-button valve 1PB is released. Three normally passing CRA contacts (lines 5, 8, and 12) change state to block flow to the flow paths 19, 20 and 21 in the manual sub-system, the operation of which is hereinafter discussed.

To start the automatic machining sequence, another push-button valve 3PB (line 3) is closed (see "cycle start"). Pressurized fluid flows from the now pressurized flow path 5 through the push-button valve 3PB into the flow path 6 (line 3). Because the tool's machining head is, at this time, in its retracted position and the workpiece clamps are open, the retraction travel limit valves 1LV and 2LV (line 3) are actuated; i.e., urged into their passing positions, permitting fluid under pressure to flow through flow paths 7 and 8 to energize the control relay valve 1CR (line 3). A normally blocked 1CR contact (line 4) changes to its passing state and establishes an alternate flow path to the flow path 8 to hold valve 1CR energized. Accordingly, releasing the push-button 3PB has no further effect.

Fluid under pressure may now flow through another passing 1CR contact from the flow path 5 to the flow path 9 (line 6), thus energizing a clamping valve 1P. The clamping valve 1P is, in the system 2000, a conventional double piloted, two-position, four-way valve, with the pilot ports $1P_A$ and $1P_B$. Still another 1CR contact, moving to its passing state, vents flow path 10 (line 7), which is connected to the opposite end of the spool (not shown) in the clamping valve 1P, thus allowing the spool of the clamping valve 1P to shift.

As the piston of the clamping cylinder (not shown) controlled by the clamping valve 1P begins to extend, it releases the limit valve 2LV (lines 3, 16) venting flow paths 6 and 7. A pressure controlled relay valve 1PV (line 9) is connected to the pressurized end of the clamping cylinder. While the clamping piston is moving with only frictional resistance restraining movement, the pressure in the pressurized end of the clamping cylinder is low, and the pressure controlled relay valve 1PV remains blocked. When the clamping piston engages and clamps the workpiece, however, the pressure immediately rises in the pressure end of the clamping cylinder and energizes the pressure controlled relay valve 1PV, closing its single contact; moving it to a passing state.

Pressurized fluid is thus allowed to flow from the flow path 5 through another 1CR contact (normally blocked but now passing) into the flow path 11, through the pressure control relay valve 1PV, and into the flow path 12 (line 9). Fluid under pressure in the flow path 12 energizes the multiple pole relay valve 2CR. A holding circuit through the flow path is established as its relay contact 2CR (line 10) changes to its passing state. A 2CR contact (line 4) vents flow path 8, deenergizing control relay valve 1CR. A 2CR contact (line 11) closed to its passing state also allows pressurized fluid to enter flow path 13 and energize the power valve 2P while shifting the power valve spool and compressing the return spring. At the same time, another passing 2CR contact (line 13) allows pressurized fluid to enter the flow path 14 from the flow path 5. This pressurized fluid in the flow path 14 is, however, blocked by the normally blocked contact of the limit valve 3LV (line 13).

The power valve 2P causes the tool head actuator cylinder (not shown) to extend its operating piston rod, the extension of which releases the limit valve 1LV (lines 3, 15). When the machine head piston rod reaches its full forward position, it actuates the limit valve 3LV, closing this normally blocked valve and allowing pressurized fluid to enter the signal port of the time-delay relay valve 1TR (line 13) through flow path 15. After the pre-set time-delay period of the valve 1TR has passed, the time-delay relay valve 1TR contacts change state.

One of the time-delay relay contacts 1TR (line 9) changes state to vent flow path 12. Another 1TR contact (line 12) changes state to vent flow path 13, thus deenergizing the power valve 2P and allowing the spool return spring in its power valve to return the power valve 2P to its normal position. Another 1TR contact (line 15) allows pressurized fluid to enter flow path 16 where it is blocked by the open limit valve 1LV, which was released when the machine head moved forward. A last 1TR contact (line 14) changes state to establish an alternate flow path to hold the valve 1TR energized.

The change of state of the spool in the power valve 2P causes the machine head cylinder to retract its piston rod, releasing the limit valve 3LV (line 13). When the machine head piston rod reaches its full retracted position, it actuates the limit valve 1LV (lines 3, 15), allowing pressurized fluid to flow from flow path 5 through flow path 16 and into flow path 17, thus energizing the control relay valve 4CR. A holding contact 4CR (line 16) of the valve is utilized to complete an alternate flow path from flow path 5 to flow path 17.

Another 4CR contact (line 6) vents the flow path 9. Yet another 4CR contact (line 7) allows pressurized fluid to flow from the flow path 5 into the flow path 10, actuating the clamping valve 1P (line 7), and causing the clamping valve spool to return to its reset condition. Another 4CR contact (line 13) vents flow path 15, de-energizing the time-delay relay 1TR.

The clamping valve 1P then causes the clamping cylinder piston rod to retract. When the clamping valve 1P removes pressure from the end of the clamping cylinder connected to the signal port of the pressure control relay valve 1PV (line 9), the valve is de-energized and its relay opens. The clamping cylinder piston rod reaches its full retracted position and actuates the limit valve 2LV (lines 3, 16), venting the flow path 17 and de-energizing the control relay valve 4CR (line 15). This completes the automatic machine cycle.

If a malfunction such as the breakage of a cutting tool should occur during the aforedescribed automatic cycle, it is desirable to retract the machine head operator piston rod to prevent additional damage to the machine. In the event of such an emergency, the machine operator depresses the "Emergency Stop" push-button valve 2PB (line 2) which vents flow path 4 allowing control relay CRA to be de-energized, thus changing the state of all contacts of CRA.

The normally blocked (CRA) contact between flow path 3 and flow path 4 prevents source pressure from entering flow path 4. The normally blocked CRA contact between flow path 3 and flow path 5 prevents source pressure from entering flow path 5, while the normally passing CRA contact between flow path 5 and exhaust vents flow path 5.

The remaining normally passing CRA contacts vent flow paths 9, 10 and 13, respectively, through the manual sub-system components. Since power valve 2P is of the spring return variety, it is immediately de-energized and the machine head piston rod is retracted, thus preventing additional damage.

It is often desirable to provide an automatic machine with a manual mode of operation for purposes of set-up and tool adjustment. With selector valve 1SV (line 2) in the "manual" (dotted line) position flow path 1 is connected to flow path 18 and pressurized fluid is available at three-way push-button valves 4PB, 5PB and 6PB for manual operation of the clamp valve and the head valve through flow paths 19 and 20 (clamp valve) and flow path 21 (head valve).

Another type of system embodying features of the invention has a capacity for pressure "memory". What is pressure memory? A brief introduction to and description of the concept is made more simple with reference to a pressure memory element 2910 of the type (see FIG. 34) used in a hydraulic control system (not shown). The pressure memory element 2910 comprises a body 2911 having a spool 2912 slidable in a bore 2913. The spool 2912 is urged against end cap 2914 by a spring 2917. When a pressurized liquid is introduced to the element through port 2916 in end cap 2914, the spool 2912 is urged against the end cap 2915, compressing the spring 2917.

Figure 34:
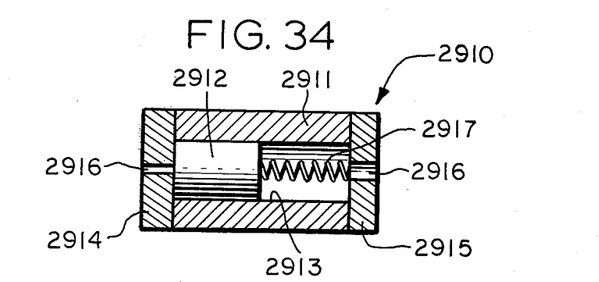
FIG. 34 is a longitudinal sectional view of an energy storage device embodying features of the invention.

The fluid in a hydraulic control system may be considered incompressible from an energy storage standpoint. In such a system, energy stored in spring 2917 may be utilized to displace the fluid stored in the memory element 2910 and operate or "drive" relays, power valves or other control devices. If a fluid under an equal or greater pressure is introduced through the port 2916 in the end cap 2915 before and during the application of pressure at the opposite end of the spool 2912 the memory element will be inhibited and will not function in the normal manner. This "inhibit" function is often useful in automatic control systems.

Figure 35:
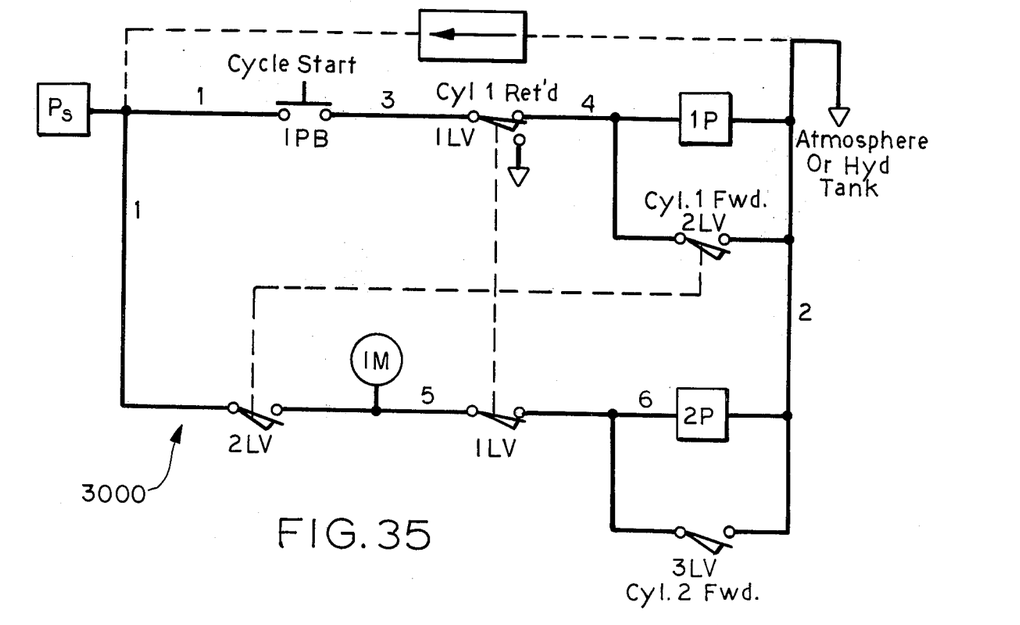
FIG. 35 is a schematic diagram of a simplified fluid control system incorporating pressure memory capabilities embodying features of the present invention.

Referring now to FIG. 35, a system 3000 utilizing a compressed gas as the control system power source permits the memory element to consist merely of a chamber of sufficient volume to store the compressed gas needed to drive succeeding logic and power devices. In some instances, the volume within the tubing connecting control elements will be sufficiently large to provide a memory element. This is particularly true in systems with a short cycle time where the residual or memory pressure will not bleed down before it is utilized for control purposes.

The simple automatic control system 3000 utilizes pressure memory elements and other control and power devices according to the present invention. This system 3000 is illustrative only and it should be understood that the versatility and complexity of any system constructed according to the present invention is limited only by the requirements of a particular application.

In general, the sequence of operations for the system 3000 is begun by the machine operator depressing the "Start" push-button. A first cylinder (not shown) is actuated and its operator piston rod extends. The cylinder then retracts its operator piston rod. A second cylinder (not shown) then extends and retracts its operator piston rod. The machine cycle is completed.

Turning now to a more detailed description of the components and the operation of system 3000, the limit valve 1LV is actuated by the piston rod of the first cylinder when it is in its retracted position. The limit valve 2LV is actuated by the piston rod of the first cylinder when it is in the fully extended position. The limit valve 3LV is actuated by the piston rod of the second cylinder when it is in the fully extended position.

The power valves 1P and 2P are conventional pilot-operated, 2-position, spring-returned, 4-way valves which operate the first and second cylinders (not shown), respectively, in a manner thoroughly familiar to those skilled in the art. The memory element 1M is a fixed volume chamber or an elongated fluid conduit, as previously described.

Starting with the first cylinder piston rod retracted, the second cylinder piston rod retracted and the control system power source PS connected to the flow path 1, manual actuation of the push-button 1PB allows pressurized fluid from the flow path 1 to enter the flow path 4, thereby energizing the power valve 1P. Releasing the push-button 1PB disconnects the flow path 1 from the flow path 3 but causes no further action.

The power valve 1P causes the first cylinder piston rod to extend, releasing the limit valve 1LV, which disconnects the flow path 3 from the flow path 4 and vents the flow path 3. A normally blocked contact on the limit valve 1LV also disconnects the flow path 5 from the flow path 6.

The first cylinder piston rod, when fully extended, actuates the limit valve 2LV, thereby connecting the flow path 4 to exhaust (atmosphere or tank), venting the pilot area of the power valve 1P and causing the power valve 1P to be de-energized. The actuation of the limit valve 2LV connects the flow path 1 to the flow path 5, allowing pressurized fluid to flow into the flow path 5 and the memory element 1M. The power valve 1P causes the first cylinder piston rod to retract, releasing limit valve 2LV, and thus disconnecting the flow path 4 from the flow path 2. The flow path 5 is disconnected from the flow path 1. Stored energy is present in the flow path 5 and memory element 1M, however, in the form of compressed gas.

The first cylinder piston rod, when fully retracted, actuates the limit valve 1LV, which connects the flow path 3 to the flow path 4. the limit valve 1LV also connects the flow path 5 to the flow path 6, allowing pressurized fluid to flow from the memory element 1M and the flow path 5 into flow path 6, thus energizing the power valve 2P. The power valve 2P causes the second cylinder piston rod to extend. When the second cylinder is fully extended, the limit valve 3LV is actuated, thereby connecting the flow path 6 to the flow path 2. This vents the flow path 5 and the flow path 6, de-energizing the power valve 2P.

The power valve 2P then causes the second cylinder piston rod to retract, releasing the limit valve 3LV. This completes the automatic cycle of the system 3000.

It should be re-emphasized here that the systems 2000 and 3000 are illustrated with their signal circuit conduits and components present but their "power" conduits and components absent. This is in keeping with standard industry practice for representing fluid control systems with fluid motors and conduits connecting them to signal components, source and exhaust not shown, all in the interest of simplicity.

It has previously been pointed out that one advantage inherent in systems embodying the present invention is that standard electrical control system symbols and notations can be used with the systems. Technicians familiar with electrical systems can immediately solve and work with these fluid systems. In line with this concept, the symbol  is employed to identify fluid pumps and compressor and the like, the counterparts of transformers or generators in electrical systems. FIG. 35 illustrates this symbol application in a dotted line alternative power connection for the system 3000.

A relatively wide range of valves which incorporate the controlled leakage feature of the invention have been described in detail. The system 2000, for example, employs a number of these valves, or variations thereof.

The control relay valves CRA, 1CR, 2CR and 3CR all include features of the invention embodied in relay valve 110. The alternative relay valve constructions 210, 310, 1010, 1110, 1210, 1310 and 1410 also embody features of the invention which make them eminently suitable for use in a system 2000 or 3000, for example.

The limit valves 1LV, 2LV and 3LV might be cam operated limit valves such as illustrated by the valve 810. The snap action feature may be employed, if desired, but is not critical to the basic limit valve operation, of course.

It must also be reiterated that certain of the valves illustrated in the system are conventional. The power valves 1P and 2P are two-position, four-way valves of well-known construction, the valve 1P being double-piloted as has been pointed out, and the valve 2P being single-piloted and spring returned.

The two-position push-button valves 2PB, 4PB, 5PB and 6PB may also be conventional in construction; i.e., they need not incorporate the controlled leakage feature which is a feature of the invention, while valves 1PB, 1SV and 3PB preferably include the controlled leakage features. The pressure controlled relay valve 1PV and the time-delay relay valve 1TR of the system 2000 would preferably be valves such as the aforedescribed valves 710 and 610, respectively.

While several embodiments described herein are at present considered to be preferred, it is understood that various modifications and improvements may be made therein.

What is desired to be claimed and secured by Letters Patent of the United States is:

1. A normally blocked fluid control valve, comprising:
   a. a valve body having an inlet port and an outlet port formed in a surface, and an unconstricted opening to exhaust means communicating with said surface, and
   b. a valve member movable relative to said surface and including passage means for placing said inlet and outlet ports in fluid communication with each other in one position of said valve member relative to said body and for blocking fluid communication between said ports in another position of said valve member relative to said body,
   c. said unconstricted opening to exhaust means communicating with said surface at a distance from said inlet port which is less than the length of any leakage path between said inlet and outlet ports,
   d. said unconstricted opening to exhaust means communicating with said surface at a location where said passage means cannot place said opening into fluid communication with said inlet port when said valve member changes positions.

2. The valve of claim 1 further characterized in that:
   a. said body has a generally cylindrical bore therein, and
   b. said surface being formed in said bore and said ports extending radially through said body into communication with said bore.

3. The valve of claim 2 further characterized in that:
   a. said unconstricted opening includes a vent aperture formed radially through said valve body.

4. The valve of claim 3 further characterized in that:
   a. an annular venting groove is formed around said bore,
   b. said vent aperture communicating with said venting groove.

5. The valve of claim 2 further characterized in that:
   a. said valve member comprises a valve spool axially slidable in said bore, and
   b. fluid control port means are formed in said body in communication with said bore at at least one end of said spool.

6. The valve of claim 5 further characterized in that:
   a. said fluid control port means comprise first and second pilot ports formed in said body in communication with said bore at opposite ends of said spool.

7. The valve of claim 6 further characterized by and including:
   a. spring means in said bore urging said spool toward said first pilot port.

8. The valve of claim 6 further characterized in that:
   a. said valve body has a first pair of inlet and outlet ports located in a first plane transverse to the axis of said bore and a second pair of inlet and outlet ports located in a second plane transverse to the axis of said bore.

9. The valve of claim 8 further characterized in that:
   a. said first and second pairs of inlet and outlet ports are arranged on axes 90° removed from each other.

10. The valve of claim 5 further characterized in that:
    a. movement of said valve spool in one direction relative to said valve body is effective to place first of said inlet and outlet ports in communication with each other before second set of inlet and outlet ports are placed in communication with each other, and
    b. said outlet port of said first pair of inlet and outlet ports being connected back to said first pilot port to provide added pressure for moving said valve spool into a position where it places said second pair of inlet and outlet ports in communication with each other.

11. The valve of claim 10 further characterized in that:
    a. at least initial movement of said spool in one direction is effected by cam means.

12. The valve of claim 6 further characterized in that:
    a. an adjustable volume chamber is formed in communication with said first pilot port;
    b. said chamber having a fluid pressure port, and
    c. whereby the pressure which is effective to actuate said valve by moving said valve spool is determined by the volume of said chamber.

13. The valve of claim 6 further characterized in that:
    a. a chamber is formed in communication with said second pilot port by an adjustable length leakage path, and
    b. said chamber being connected to exhaust means.

14. The valve of claim 2 further characterized in that:
    a. said movable valve member comprises a valve spool having an annular groove formed therein to define said passage means for connecting said inlet and outlet ports when said groove is axially aligned with said ports.

15. The valve of claim 2 further characterized in that:
    a. said movable valve member comprises a valve spool having a radial passage extending therethrough for connecting said inlet and outlet ports when said passage is aligned with said ports.

16. The valve of claim 15 further characterized in that:
    a. said spool is axially movable in said bore.

17. The fluid control valve of claim 15 further characterized in that:
    a. said spool is rotatable in said bore.

18. The fluid control valve of claim 1 further characterized in that:
    a. said surface is substantially planar, and
    b. said valve member being a valve slider movable on said surface in sealing engagement therewith.

19. The valve of claim 15 further characterized by and including:
    a. means orientating said valve spool in said bore so that it is fixed against rotation on its axis.

20. The valve of claim 2 further characterized in that:
    a. said valve body having at least two pair of inlet and outlet ports, each pair of inlet and outlet ports located in a separate plane transverse to the axis of said base,
    b. said unconstricted opening to exhaust means communicating with said surface between said pairs of inlet and outlet ports.

* * * * *